2,799,646

EXTERNAL WATER PHASE DRILLING EMULSIONS AND ADDITIVES THEREFOR

Felix E. Lacey, Chicago, Ill., and Albert G. Schuessler and Charles B. Swain, Oklahoma City, Okla., assignors to Swift & Company, Chicago, Ill., a corporation of Illinois, and Mud Control Laboratories, Inc., Oklahoma City, Okla., a corporation of Delaware No Drawing. Application August 25, 1954,
Serial No. 452,228

36 Claims. (Cl. 252—8.5)

This invention, in general, relates to suface active agents and emulsified oil-in-water drilling fluid systems used in the boring of oil and gas wells, which systems utilize said surface active agents. More specifically, the present invention relates to surfactants made from sperm oil and constituents thereof, oil-in-water drilling fluids emulsified by said materials, and the boring of oil and gas wells wherein said fluids are utilized.

In rotary boring of oil and gas wells, it is the practice to circulate a drilling fluid through the bore hole during the drilling operation. The drilling fluid is pumped down the drill pipe and passes through ports in the drill bit. Then the fluid is forced upward through the annular space between the drill pipe and the walls of the bore hole to the surface, where it is discharged into a pit or open tank. The drilling fluid system is used primarily to remove formation cuttings, to lubricate the drill bit, to provide a coolant for the drill bit and drill pipe, to protect against heaving and to control the pressure in the bore hole by providing a hydrostatic head which serves to resist blow-outs due to excessive formation pressures which may be encountered.

In general, drilling fluids of the type with which the instant invention is concerned comprise oil-in-water emulsions in which a solid component such as finely divided clays, bentonite, and/or drilled-up solids is suspended. In addition to treatment with conventional thinners such as caustic and quebracho, soda ash is frequently added to the fluid to remove calcium in order that maximum yield of hydratable clays may be realized. The addition of an oil phase to such systems serves to increase the rate of drill penetration and to reduce fluid loss, fluid friction, torque and balling of shale solids around the bit.

Many additives have been suggested and used in drilling fluid systems in attempts to secure increased dispersion of added oil and to obtain essential stability. However, in most instances these additives fail to reduce and disperse oil phase material to an extent approaching colloidal proportions since surface and interfacial tension effects are lacking in these additives. Further, these systems are often adversely affected by contamination arising from drilled solids, hard make-up water, salt water invasion or intentional contaminations such as may be required in lime-base systems and the like. Quite often, the emulsions break or revert during the drilling operation due to the presence or a build up of contaminants. Furthermore, poorly dispersed oil-phase systems may contribute to poor hole conditions and injury to the permeability of oil bearing formations.

Also, drilling fluids known to the oil industry have exhibited a relatively high fluid loss to the formation, necessitating the addition of fluid loss control compositions such as carboxy methyl cellulose or starch to the fluid. High fluid loss in turn creates heaving and/or sloughing problems in shale formations through hydration and swelling of shale particles and lubrication of shale bedding planes by the invading fluid. Heaved or sloughed formations are the primary causes of stuck drill pipe.

Geologists have objected to the use of oil in drilling systems because the presence of oil in said system has been the source of confusion in evaluation of geological samples. Their objections have been justified where the oil phase is free or poorly dispersed. Under these conditions, free oil from the drilling fluid may invade the cuttings and impart a fluorescence in geological analysis procedures similar to cuttings from an oil bearing formation.

Therefore, it is an object of this invention to provide additives specifically designed for use in drilling fluids.

An additional object is to provide additives for drilling fluids which are relatively insensitive to ion contamination.

An additional object is to provide additives for emulsifying drilling fluids wherein said fluids have relatively little tendency to foam.

An additional object of this invention is to provide an emulsified oil-water-solid drilling fluid utilizing an additive of this invention, the strongly surface-active nature of which provides a stable emulsion of oil-in-water through surface and interfacial tension reduction.

Another object is to provide a drilling fluid having low fluid loss characteristics.

Another object is to provide an emulsified drilling fluid having a wide tolerance to ion contamination resulting from drilled solids.

An adidtional object is to provide a drilling fluid containing an additive which is compatible with weighting materials, such as barium sulfate and iron oxide and like weighting agents.

An additional object is to provide an emulsified oil-in-water drilling fluid, the filtrate of which is readily removed during completion of the well.

Another object is to provide a stable external aqueous phase emulsion wherein the aqueous phase contains ionic compounds which minimize hydration and damage to permeability of oil bearing formations.

A further object is to provide a stable oil-in-water emulsion containing one or more of the following ionic constituents for inhibiting formation damage: sodium chloride, hydroxide ion, and bivalent metal electrolytes.

A further object is to provide a method of drilling oil and gas wells with a surface active oil-in-water emulsion wherein hydration and heaving of shale strata is minimized through low fluid loss and the presence of bivalent metals in the aqueous phase.

An additional object is to provide a method of drilling pay zones of oil and gas wells with an oil-in-water emulsion containing surface active constituents to facilitate removal of connate water and an aqueous phase containing ions which minimize swelling of hydratable intergranular clays in the pay zone.

A still further object is to provide an oil-in-water drilling fluid, the oil of which does not cause confusion in geological sample evaluation.

Other objects will be apparent to one skilled in the art from the following detailed description.

While conditions vary from well to well, it has been the general experience with fluids of this invention that the problems previously presented have been substantially reduced. These fluids produce a thin, compact mud sheath of low permeability which materially reduces fluid loss and its effect on heaving and/or sloughing of shale beds. The surface activity of the additives of this invention lowers the interfacial tension between the oil and water phases. Lower values of interfacial energies are associated with relatively easier phase dispersion and greater adhesive forces between the phases once dispersed. The stability of the emulsions of the present invention is attributed mainly to uniform, small oil particle size, which is in turn the result of surface activity of the additives in lowering interfacial tension between the liquid phases. Reduction of interfacial tension permits dispersion of the oil throughout the water phase as particles reduced to sizes approaching colloidal proportions, in which state they contribute to viscosity increase and resistance to flow through the porous media of the mud sheath and surrounding formation.

Reduced fluid loss, however, cannot be attributed solely to surface and interfacial effects between the liquid phases. The solids in the hydrated and fully dispersed state, wherein the shape and size of the particles acquire definition and a uniformly distributed mobile water film exists on the particle surfaces, also materially decrease fluid loss. The surface activity provided by the additives of this invention apparently exists in the aqueous film on the particles and thus further contributes to decreased permeability of the mud sheath on the bore wall.

The loss of oil phase material from truly surface active oil-in-water emulsions is decidedly less than is observed in non-surface active systems. This is attributed to the fact that in surfactive emulsions the oil and water are bonded or are so actively commingled through surface and interfacial force reduction that oil will approximate its percentage part of the liquid phase of the system. In non-emulsified systems, the comparatively free oil is lost more readily to the formations, and the loss is accordingly out of proportion to the oil content of the fluid phase. Oil phase loss from these latter systems have been observed to be approximately twice as extensive as surface active systems of this invention, otherwise identically formulated.

Samples cut in the presence of a truly surface active oil-in-water emulsion such as that provided in this invention will clean up simply by water washing. The emulsifier of this invention exhibits fluorescence, but the color is a bright and pronounced blue. The color of fresh crude oil will usually be yellow or yellowish green. Aged crude oil loses brightness and is distinguishable from the fresh oil present in cuttings from a productive zone. Experienced geologists have reported that they have no difficulty in interpreting samples obtained under the conditions provided by our emulsions.

Fresh water emulsion of the oil-in-water type accomplished by means of the surface active agent of the instant invention are amenable to weight control in that the oil phase will contribute to weight reduction where low weight systems are desired or where drilling conditions will permit. Moreover, surface active emulsions show less tendency to retain undesirable solids such as sand and other extraneous non-hydrating solids which usually contribute to a major contamination. This singular property thus contributes to weight control by retaining particles of desired size and specific gravity.

The additive of this invention is an alkali metal or alkaline earth salt of sulfated sperm oil in combination with a defoamer. Sperm oil is obtained from the blubber and head cavity of the sperm whale (*Physeteridae*) and comprises mainly wax esters of higher fatty acids and fatty alcohols with subordinant amounts of triglycerides. The active ingredients of the sulfated sperm oil are surfactants or surface active compositions. These surfactants are alkali metal or alkaline earth salts of sulfated wax esters of higher monohydric alcohols ($C_{14}$–$C_{20}$ in chain length) and fatty acids ($C_{10}$–$C_{20}$ in chain length) which are formed by sulfation at the double bonds and neutralization of the esters of unsaturated alcohols and saturated acids, saturated alcohols and unsaturated acids, and unsaturated alcohols and unsaturated acids present in sperm oil. The preferred defoamer is a mixture of complex compounds obtained from the residue of the propane decolorization of fatty substances. This defoamer is described in U. S. Patent No. 2,668,138, issued to John J. Walker and John E. Farbak on February 2, 1954, the disclosure of which is incorporated into this description by reference.

A carrier such as prime burning oil, No. 1 lard oil, soybean oil, peanut oil, mineral oil and mono-glycerides, and extra winter strained oil is generally used with the above defoamer. The kind of oil used as a carrier is unimportant except as a convenience in reducing the viscosity of the mixture. In a preferred embodiment of the invention, the complex mixture is used in greater quantity than is necessary to suppress foam formation in the drilling fluid because it is also surface-active and gives a synergistic effect with the salts of sulfated sperm oil in improvement of emulsion properties.

However, other defoamers may be used successfully with the modified sperm oil emulsifier. Pine oil, castor oil, linseed oil, sugar cane oil obtained from dewaxing sugar cane, diesel distillate, and long chain aliphatic alcohols are examples of such defoamers. In using other defoamers, however, it is generally desirable to add the above described complex mixture in amounts of about 5–10% by weight of the sperm oil to fortify the surface activity of the modified sperm oil.

The ratio of sperm oil to defoamer is not critical. In most applications, a composition of the formula 75–90% modified sperm oil and 10–25% defoamer is satisfactory. Other materials may be incorporated into the emulsifier without departing from the spirit and scope of the invention.

Winterized sperm oil sulfate salts in combination with a defoamer obtained from the decolorization of fatty materials or other defoamers is an additional embodiment of an additive for use in drilling fluid systems. Winterized sperm oil is obtained by solvent crystallization of the saturated wax fraction and separation of the lower melting fractions of crude sperm oil with a liquid hydrocarbon such as propane or other normally gaseous hydrocarbon. An alternative procedure for the derivation of winter sperm oil involves the selective solidification of the higher melting fractions and subsequent separation of the lower melting fractions of crude sperm oil by procedures known in the art. Fortification of winterized sperm oil with sperm stearine which contains wax esters, mainly cetyl laurate, cetyl myristate, and cetyl palmitate, may be desirable to improve the stability of the emulsions, particularly where high hole temperatures are encountered. The fortified or unfortified lower melting fraction is then sulfated and neutralized according to the procedure described above. This embodiment has the advantage of consistency of product composition.

It is thus the case that the aforementioned mixture of head and blubber oils of the sperm whale, which contains about 12–13% fully saturated esters, would produce upon sulfation and neutralization a more stable emulsion, particularly at high temperature conditions, than sulfated, neutralized sperm blubber oil which contains only about 2% of fully saturated compositions. This latter figure includes fully saturated triglycerides. Expressed in terms of wax esters, about 18% of the wax esters of the mixture of head and blubber oils of the sperm whale are fully saturated esters as compared to somewhat less than 3% in the case of blubber oil.

More specifically, the process for producing the modified sperm oil emulsifier involves the reaction of sperm oil and concentrated sulfuric acid in a sulfonator in the ratio of about 3–4 parts by weight of sperm oil and 1 part by weight sulfuric acid. The concentrated acid is added as quickly as possible, but care must be exercised to maintain the temperature below 90° F. Cooling is maintained throughout the entire sulfation period. After all the acid has been added stirring is continued for one hour.

The sulfated oil is then run into a wash tank of 11° Bé. sodium sulfate brine at 110° F. The oil and brine are mixed thoroughly with care to avoid excessive emulsification. The brine is drawn off as quickly as possible. The washed sulfated oil is first partially neutralized by carefully adding 21° Bé. sodium hydroxide until the pH of the mixture is about 4–5. The product is allowed to stand over night.

The following day, the brine layer is drawn from the bottom and caustic soda is added with agitation. The amount of caustic soda added is sufficient to raise the pH of a mixture of 9 parts water and one part of the oil to 6.2–6.7. After final neutralization, the product is finished by adding a small amount of formaldehyde. At this point, the defoamer may be mixed with the modified oil, or the defoamer may be added at any time up to the addition of the product into the well bore. Agitation for about 15 minutes insures a uniform mixture.

If winterized sperm oil is the oil which is sulfated, the sulfation procedure is the same except that it may be desirable to fortify the sperm oil with cetyl esters of lauric, myristic, and palmitic acids in sperm stearine as described above. The latter can be obtained by solvent crystallization and separation from crude sperm oil by a liquid, normally gaseous hydrocarbon, i. e., propane. This method of separation, which can be supplemented or replaced by selective solidification and subsequent physical separation procedures known in the art, is based on the relative solubilities of saturated and unsaturated fatty constituents in liquid propane under varying conditions of temperature and pressure. Having established the optimum conditions for separation, it is possible to separate the esters previously referred to from sperm oil. After the fortified or enriched product has been sulfated the resultant product is further processed by the addition of a mixture of the complex compounds obtained as the residue from the propane decolorization of fatty materials or other defoamers. The cetyl esters are added prior to sulfation in amounts up to 50% by weight of sperm oil wherein the fully saturated wax esters comprise about 43% of the total wax esters and about 33% of the total fortified sperm oil, and the mixture of the complex compounds obtained as the residue from the propane decolorization of fatty materials is added after the sulfation and neutralization of the oil.

In the above procedures, potassium sulfate and hydroxide may be substituted for sodium hydroxide and sodium sulfate to give the corresponding alkali salt of sulfated sperm oil. The alkaline earth salts, i. e., calcium, magnesium, barium, and strontium, are most easily produced by preparation of alkali metal salt according to the above procedure, and mixing the modified sperm oil and a concentrated water solution of salts of the alkaline earths such as the chlorides. By base exchange mechanism, the alkaline earths replace the alkali metals to form the sulfated sperm oil alkaline earth salt. However, the alkaline earth salts, particularly calcium, may be prepared in a manner similar to the procedure for the alkali metal salt by washing with a soluble alkaline earth inorganic salt such as the chloride after acidation of the sperm oil, and addition of the alkaline earth hydroxides in small quantities and at intervals to neutralize the acid sulfated sperm oil.

It is generally believed that the products of the above described sulfation process, commonly referred to in the fats and oil industry as "sulfonation," are sulfates as represented by the grouping $-CH_2OSO_2OH$. Sulfonates, which have the grouping $-CH_2SO_2OH$, are believed to form only in minor amounts even though the industry generally refers to such processes as sulfonation reactions. However, it is not intended that the invention be restricted by any particular designation of the process or final product, but that all products coming within the intended scope of the invention as described be encompassed herein.

In accordance with one embodiment of this invention, the drilling fluid system is an emulsion of oil-in-water with water as the continuous phase. In this system are dispersed finely divided solids that are well-known in the art. The amount of solids suspended and/or dispersed in the aqueous phase may vary between 5 to 35% by weight of the water. The emulsified petroleum oil may range up to about 50% by volume of the resulting emulsion. However, in most applications, it is preferred that the amount of petroleum oil range between about 10 and 20% by volume. The amount of emulsifier should be at least about ½% by weight based on the water content of the prepared drilling fluid. The upper limit of emulsifier used is governed principally by cost of the ingredients. In most drilling operations, it is preferred to use about 1½ to 2% by weight of the emulsifier.

In commercial practice, it will be convenient to mix the modified sperm oil with the defoamer and package the mixture for shipment to drilling sites for addition to the drilling fluid. Such a mixture represents one embodiment of the invention herein disclosed.

However, it is apparent from the foregoing description that the defoamer and sulfated oil may be mixed at the drilling site. In most applications, the sulfated oil and defoamer are added to the drilling fluid system with the desired amount of petroleum oil. No special mixing equipment is required. Generally, one or two complete circulations of the drilling fluid through the hole are utilized to add all of the material. An additional procedure is to mix the sulfated oil additive directly with the petroleum oil and then add the mixture directly to the drilling fluid system. This method is eminently satisfactory since the sulfated oil and defoamer are soluble in petroleum oils.

An alternative procedure for determination of the amount of emulsifier and defoamer to be added to the drilling fluid is the addition of sufficient modified oil and defoamer to reduce the surface tension of the aqueous phase of the drilling fluid to around 30–50 dynes per centimeter, followed by addition of the desired volume of petroleum oil. A drilling fluid having the low surface tension aqueous phase indicated above has been found to provide excellent protection to the producing formation, through ready removal of any invading fluid or solids during the completion stage.

It is a simple matter to test the drilling fluid for the concentration of modified sperm oil so that it may be maintained within the proper limits during the drilling operation. For example, filtrate from drilling fluid obtained from a pressure filter such as that standardized by the American Petroleum Institute may be tested with any type of surface tension testing instrument. In this manner, the surface tension may be maintained at whatever value is needed to effect a stable oil-in-water emulsion.

Since it is necessary to add some fluid to the circulation systems as the drilling progresses, it will be apparent that corresponding make-up quantities of modified sperm oil and defoamer will be required.

The following examples are to be considered as illustrative of, but not limiting, on the scope of the invention as defined in the appended claims:

EXAMPLE I

A drilling fluid prepared according to this invention was used in drilling a well in Custer County, Oklahoma. The upper part of the hole was flush drilled, and a salt yielding gel was used to drill a salt section to a depth of 6800 feet. At this point, pipe was set to case off the salt, and the salty system was discarded and replaced by an oil-in-water emulsion drilling fluid of 10% oil prepared according to this invention. The emulsified system was maintained in effect from 6800 to 11,600 feet. Effective control of fluid loss and surface tension is apparent from the rheological data tabulated below:

emulsified drilling fluids. The emulsions were compatible with thinners, soda ash, and weighting agents used in

| Depth in Feet | 7,160 | 8,191 | 9,217 | 10,044 | 11,154 | 11,440 | 11,590 | 11,600 |
|---|---|---|---|---|---|---|---|---|
| Wt. Lbs./gal | 8.8 | 9.5 | 9.7 | 10.0 | 9.9 | 10.1 | 10.1 | 10.9 |
| Visc., API, 1 qt. Out/sec | 38.0 | 51.0 | 68.0 | 102 | 150 | 227 | 195 | 200 |
| Visc., cpe. @ 600 R. P. M | 18.0 | 37.0 | 37.0 | 81 | 102 | 115 | 103 | 110 |
| Init. Gel | 0 | 0 | 0 | 0 | 0 | 0 | 0 | 0 |
| 10' Gel | 0 | 0 | 0 | 0 | 0 | 0 | 0 | 0 |
| Fluid loss 30' | 5.1 | 3.6 | 3.7 | 2.8 | 3.1 | 3.0 | 3.3 | 3.4 |
| Cake 32/in | 1.0 | 1.0 | 1.0 | 1.0 | 1.0 | 1.0 | 1.0 | 1.0 |
| pH Hydrion | 10.0 | 9.6 | 9.5 | 9.7 | 9.4 | 9.7 | 9.5 | 9.5 |
| Salt, p. p. m. NaCl | 2,500 | 2,700 | 3,000 | 2,800 | 2,300 | 2,300 | 2,300 | 2,200 |
| Surface Tens., Dynes/cm | | 37.0 | | | 36 | | | |

Rapid drilling rates were experienced throughout. Drilling time on this well to 11,600 feet was a record in this area.

EXAMPLE II

A "wildcat" well in Coal County, Oklahoma, was drilled with a fluid prepared according to this invention. This area has proved to be exceedingly difficult to drill because of the unusual thickness of the shale section. A fresh water-gel system was converted to an oil-in-water emulsion when the drilling proceeded out from under surface pipe by addition of 10% diesel distillate and 1.0% by volume of the sodium salt additive of this invention to the system.

Drilling progressed rapidly to 11,000 feet where 9⅝ inch casing was set. The choice of the casing point was dictated by the tensile strength of the pipe and not from hole troubles that could well have developed during the drilling of some 7000 feet of Atoka shale to this point. The casing was set and cemented with 800 sacks of cement with excellent fill up, indicating good shale formation protection during the drilling operation.

Mechanical difficulties developed in the latter part of the casing program. While repairs were made, the pipe hung for ten and one-half hours. On completion of repairs, the casing was lowered 10 feet after which circulation was established at 1500 p. s. i. However, the pressure quickly broke back to 800 p. s. i.

Drilling progressed from under the casing through more Atoka shale to about 13,000 feet where cherty lime was encountered. At the last recording, the well was near 15,500 feet with 4,500 feet of open hole standing up well. The operation has been singularly free of the commonly accepted difficulties associated with shale drilling in Oklahoma and was four months ahead of the most optimistic schedule set up by the operator. The following data was recorded at various depth intervals of the drilling operation:

formulating the drilling fluids and remained stable in the presence of contamination of the fluid from drilled-up solids.

Inhibitive drilling fluid emulsions

It has long been known that the productivity of many wells is considerably lower than is expected as indicated by drill stem tests taken immediately following initial drilling of the producing sand. It is a well recognized fact, based on core analysis and on actual production experience, that most sands of the Pennsylvanian series contain colloidal, intergranular clays which ten to swell when invaded by the filtrate from conventional muds. For instance, in zones having permeability in the range of 60 millidarcies or less, this swell propensity may so completely block the pay as to preclude commercial production when actually, the zone was commercially productive had means been provided to leave the clay inclusions substantially unchanged. The destruction of permeability has been traced to the invasion of the producing sand by filtrate from drilling fluids containing high percentages of sodium carbonate, which through base exchange mechanism hydrates the intergranular clays with consequent swelling of the clay particles and reduction in permeability. These sands are commonly referred to as water-sensitive sands.

It has been established that the addition of sodium chloride and bivalent metal electrolytes, such as calcium chloride, calcium hydroxide, or calcium sulfate, to aqueous drilling fluids minimizes swelling of hydratable clays. The addition of these ionic materials adversely affects the colloidal clays or other solids used in drilling muds, however, by flocculation of said clays or other solids. To counteract this flocculation and subsequent settling of the agglomerated particles, materials such as starch or carboxy methyl cellulose are added to hold the clay in suspension.

| Depth in Ft | 8,342 | 9,194 | 9,753 | 11,606 | 11,450 | 15,348 | 15,420 |
|---|---|---|---|---|---|---|---|
| Formation | Shale | Shale | Shale | Shale | Cty Ls | Cyt Ls | Lime |
| Wt., #/gal | 10.2 | 9.9 | 10.3 | 10.5 | 11.8 | 11.9 | 11.9 |
| Visc., API, qt. out sec | 200 | 300 | 240 | 147 | 166 | 234 | |
| Visc., cpe. @ 600 R. P. M | 160 | 170 | 180 | 141 | 165 | 194 | 152 |
| Init. Gel | 0 | 0 | 0 | 0 | 1 | 2 | 0 |
| 10' Gel | 3 | 2 | 7 | 0 | 5 | 4 | 2 |
| Fluid Loss 30' | 3.3 | 3.8 | 3.5 | 4.3 | 4.6 | 7.0 | 6.4 |
| Cake 32/in | 1+ | 3 | 2 | 2 | 2 | 2+ | 3+ |
| pH Hydrion | 10.5 | 10.7 | 10.0 | 10.3 | 10.0 | 10.0 | 9.2 |
| Salt, p. p. m. NaCl | 1,750 | 1,800 | 1,400 | 900 | 800 | 800 | |
| Oil Content, Volume Percent | 5.0 | 5.3 | 11.2 | 7.0 | 5.6 | 5.0 | 4.5 |
| Surface Tens., Dynes/cm | | | 39 | 38 | | 41 | 43.5 |

It is to be noted from the foregoing examples that test wells drilled with the drilling fluids of this invention were more true to gauge than heretofore experienced in drilling through similar formations with other types of drilling fluids, thus indicating a reduction in heaving and sloughing of shale beds. When the drilling rigs were shut down for periods of several hours, the viscosity of the drilling fluid did not materially increase as is common with many The benefits obtained by addition of sodium chloride, hydroxide ion, and bivalent metal electrolytes to aqueous drilling fluids have not been realized in commonly used drilling fluids of the oil-in-water emulsion type. The emulsifiers for the latter fluids are rendered ineffective by ion contamination, particularly calcium, and as a consequence the emulsions are unstable.

The additives of this invention, on the other hand, are relatively tolerant to electrolytes. The drilling fluids of this embodiment of the invention combine the benefits obtained from surface activity, e. g., smaller fluid loss and relatively easier removel of invading filtrate and connate water from the producing sands, with the inhibiting effects on swelling obtained in fluids containing sodium chloride, hydroxide ions, and bivalent metal electrolytes. Drill stem tests and completion results have repeatedly shown higher productivity than would be expected from the inhibiting effect alone. These results indicate that the surface active materials of this invention provide the necessary disruption of the interfacial forces between connate water and the capillary walls to facilitate removal of the considerable amount of connate water in the vicinity of the bore hole, thus making additional permeability available and favorably conditioned for increased flow of oil.

Electrolytes may be added to drilling fluids for reasons other than protection of the pay zone. Sodium chloride is often added in concentrations sufficient to at least substantially saturate the water base of the drilling fluid when the drilling operation must pass through a salt bearing strata. If ordinary unsaturated drilling fluids are used to drill through a salt bearing strata, the fluid dissolves this salt to a great extent as the drilling mud is circulated in the drilling operation. As the salt strata dissolves, there is a weakening in the strata above and below the salt bearing strata and the consequent danger of formation "heaving" into the bore.

Water soluble salts of bivalent metals are often added to drilling suds to inhibit heaving or sloughing of shale and to increase accuracy in bore hole electric logs. These salts may be the chlorides, nitrates, sulfates and the like of bivalent metals such as calcium, barium, magnesium, strontium, zinc or other like metals. Calcium as calcium chloride or calcium sulfate (gypsum) is the preferred metal electrolyte. Magnesium, barium and zinc are also desirable. The use of magnesium, however, is limited in that it precipitates as the hydroxide in alkali fluids. Calcium ion concentration in the aqueous phase is most easily controlled by the use of gypsum as the source of the calcium ion. Gypsum, or calcium sulfate, is sparingly soluble in water, but it solubility in sodium chloride is somewhat higher. On the other hand, caustic soda appears to depress its solubility. This solubility situation permits control of calcium ion concentration in the aqueous phase by controlling the alkalinity and salt content. By maintaining not less than 50 epuivalent parts per million (e. p. m.) of OH— and salt in the range of 10,000 to 20,000 parts per million (p. p. m.), the total hardness will range from 250–450 p. p. m. expressed as $CaCO_3$. Under this situation maximum dehydration and reduction in particle size of clay solids is obtained.

The additive is an alkali metal or alkaline earth salt of sulfated sperm oil in combination with a defoamer as described in the foregoing description. While the above additive may be used alone as the emulsifying agent, it often is desirable to include in the formulation other organic materials to lower the pour point, and to provide a carrier for the mixture. The following example is illustrative of a mixture which provides a good pour point, but does not constitute any limitation on the scope of the present invention other than as appears in the appended claims.

EXAMPLE III

The following compositions are mixed in the approximate volume percentages described:

| | Percent |
|---|---|
| Alkali metal or alkaline earth salt of sulfated sperm oil plus defoamer | 45 |
| Sodium salt of petroleum sulfonates | 15 |
| Diesel fuel or other carrier | 40 |

The sodium salt of petroleum sulfonates is utilized to achieve lower pour points, and the amount added depends upon the anticipated temperatures at the well site. In a cold climate, it may be desirable to add larger amounts of pour point depressant. Other materials such as weighting agents, gelatinizing compositions, thixitropic agents and other additives for various purposes may be added to the system wherever desired.

Generally, an aqueous base drilling fluid or an "uncontaminated" oil-in-water emulsion fluid, preferably emulsified by the additive of this invention, will be employed to approach the pay zone. The conversion of a water base or emulsion mud system to an inhibitive, surface-active emulsion system should be undertaken sufficiently above the pay zone to be protected as to permit the establishment of uniform characteristics before entering this zone. Thirty-six to forty-eight hours will usually prove adequate for the conversion phase. In preparation for conversion the system in effect will require dilution to an extent depending on the viscosity and weight due to bentonite and/or drilled solids. The higher these are, the more dilution required to assure an easy conversion. Weights of less than ten pounds per gallon and viscosities in the range of fifteen to twenty centipoises are most desirable. In case higher viscosities are necessary during conversion, this can usually be provided for by jetting the pits to a point which will permit water additions during the conversion. The solid phase undergoes change from a relatively dispersed condition to one of dehydration and reduction in particle size with the result that a well conditioned base mud serves to mitigate a tendency toward development of high viscosity and gels.

Pilot tests are useful prior to the actual conversion in order to establish optimum characteristics for the starting mud and to provide data indicating the properties of the finished system.

Conversion to an inhibitive fluid is accomplished by addition of reagents to bring the composition of the drilling fluid to the following composition per barrel of fluid: caustic soda, 2–3 lbs; quebracho or other thinning agent, 1–2 lbs.; sodium chloride, 5–7 lbs.; lime or gypsum or other bivalent metal salt, 2–3 lbs.; and starch, 1–3 lbs., or carboxy methyl cellulose, ½–1 lb. In addition, 5–25% by volume petroleum oil, crude or distillate, and ½–5% by volume of the additive of this invention are added to the system.

The usual sequent of additions is as follows: quebracho, caustic, salt and gyp over two to three circulations. Quebracho requirements in the conversion will depend on the amount of solids in the base mud and additions will be most effective when proportioned into the systems as dehydration and reduction in particle size of the solids progresses. Starch and/or carboxy methyl cellulose additions follow the inhibitors during the third or fourth cycle. Water loss controls should have a full cycle, if possible, before oil addition is started. The break-over is started by adding the caustic soda along with quebracho as required to suppress any thickening resulting from the high causticity. Two or three circulations or more may be required for the caustic additions during which time the pH of the system will have increased to about 13.0. With the caustic additions well under way addition of the gypsum requirements may proceed over one or two circulations and this will be followed in turn by the addition of the required amount of salt. It is frequently possible to add the gypsum and salt at the same time, the feasibility of this being a matter for the service engineer to decide from his observation of the fluid characteristics.

The following chemical composition is desired in the inhibited mud filtrate:

12.5–13.5 pH
50.0 or more e. p. m. OH⁻
e. p. m. $CO_3$ at lowest possible level
300 or more p. p. m. Total hardness as $CaCO_3$
8,000 to 30,000 p. p. m. NaCl The following example of a field application of an inhibitive type drilling fluid is illustrative of the utility of this embodiment of the invention:

EXAMPLE IV

The oil bearing sands of a well in Erin Springs Field, Garvin County, Oklahoma, were drilled by converting an aqueous base drilling fluid to an oil-in-water surface active emulsion with swelling inhibiting ions in the aqueous phase by the procedure described in the foregoing description. Drilling proceeded through four feet of Hart sand which later flowed on production test 143 barrels per day through a 16/64" choke after a 2000 p. s. i. hydraulic fracture. Drilling was continued through a Springer sand of 47 feet thickness. This sand flowed on production test 257 barrels per day through a 14/64" choke at 480 p. s. i. tubing pressure. The following data was recorded both prior and after conversion to an inhibitive system, the first column indicating the fluid characteristics prior to conversion:

| Depth | 8,180 | 8,305 | 8,831 | 9,717 | 9,826 |
| --- | --- | --- | --- | --- | --- |
| Wt., #/gal | 10.0 | 9.2 | 9.8 | 9.6 | 9.7 |
| Visc., API, Qt. out, Sec | 55 | 90 | 120 | 82 | 78 |
| Visc., cpe. @ 600 r. p. m | 37 | 55 | 68 | 49 | 48 |
| Init. Gel | 0 | 0 | 0 | 0 | 0 |
| 10' gel | 20 | 40 | 13 | 0 | 0 |
| Fluid loss 30' | 9.0 | 5.8 | 8.0 | 3.8 | 3.6 |
| Cake 32/in | 2+ | 2 | 2+ | 1 | 1 |
| pH Hydrion | 9.0 | 13.0 | 13.0 | 13.0 | 13.0 |
| Salt, p. p. m. NaCl | 5,400 | 15,400 | 18,000 | 18,000 | 18,000 |
| Sand Content, Volume percent | 0.7 |  |  | 0.4 | 0.3 |
| Oil Content, Volume percent | Nil | 12.0 | 11.5 | 23.0 | 25.0 |
| Surface Tens., Dynes/cm |  | 37 |  | 37 | 39 |
| Total Hardness, p. p. m. CaCO$_3$ | Nil | 300 | 340 | 310 | 320 |
| Hydroxide Ion, e. p. m. OH | Nil | 64.0 | 90.0 | 100.0 | 98.0 |
| Carbonate Ion, e. p. m. CO$_3$ | 7.2 | 190.0 | 70.0 | 80.0 | 70.0 |
| Bicarbonate Ion, e. p. m. HCO$_3$ | 3.0 | Nil | Nil | Nil | Nil |
| Bentonite-filtrate Yield Test | 8.0 | 2.1 | 1.9 | 1.85 |  |

Obviously, many modifications and variations of the invention as hereinbefore set forth may be made without departing from the spirit and scope thereof, and therefore only such limitations should be imposed as are indicated in the appended claims.

We claim:

1. A drilling fluid for wells comprising water as the continuous phase, a mineral oil emulsified therein, an emulsifying agent dispersed in said fluid for maintaining the oil-in-water emulsion comprising a surfactant from the group consisting of alkali metal and alkaline earth salts of a sulfated sperm oil, and a defoamer to control foam in said fluid, the aqueous phase of said emulsion being alkaline and containing bivalent metal ions to inhibit swelling of hydratable formation clays.

2. A drilling fluid for wells comprising water as the continuous phase, a mineral oil emulsified therein, an emulsifying agent dispersed in said fluid for maintaining the oil-in-water emulsion comprising an alkali salt of sulfated sperm oil, and a defoamer in sufficient quantity to suppress foam formation in an emulsified drilling system, the aqueous phase of said emulsion being alkaline and containing bivalent metal ions to inhibit swelling of hydratable formation clays.

3. The drilling fluid of claim 2 wherein the defoaming agent is a mixture of complex compounds obtained as the residue from the propane decolorization of fatty materials and is present in an amount substantially in excess of that necessary to suppress foam formation in the emulsified drilling system.

4. A drilling fluid for wells comprising water as the continuous phase, a mineral oil emulsified therein, an emulsifying agent dispersed in said fluid for maintaining the oil-in-water emulsion comprising a surfactant from the group consisting of alkali metal and alkaline earth salts of sulfated sperm oil, and a defoamer comprising a mixure of complex compounds obtained as the residue from the propane decolorization of fatty materials, the aqueous phase of said emulsion being alkaline and containing alkaline earth ions to inhibit swelling of hydratable formation clays.

5. A drilling fluid for wells comprising water as the continuous phase, a mineral oil emulsified therein, an emulsifying agent dispersed in said fluid for maintaining the oil-in-water emulsion comprising a mixture of wax esters of monohydric alcohols ranging from 14 to 20 carbons and monobasic aliphatic acids ranging from 10 to 20 carbons; fully saturated wax esters comprising at least 18 and not more than about 43 percent of the total wax esters; the remainder of said wax esters comprising a member from the group consisting of alkali metal and alkaline earth salts of sulfated wax esters; and as a minor ingredient, a defoamer.

6. A drilling fluid for wells comprising water as the continuous phase, a mineral oil emulsified therein, an emulsifying agent dispersed in said fluid for maintaining the oil-in-water emulsion comprising a mixture of wax esters of monohydric alcohols ranging from 14 to 20 carbons and monobasic aliphatic acids ranging from 10 to 20 carbons and mixed triglycerides of the aforementioned acids; the wax esters being the predominating portion of said mixture; fully saturated wax esters comprising at least 12 and not more than about 33 percent of said mixture; the remainder of said wax esters comprising a member from the group consisting of alkali metal and alkaline earth salts of sulfated wax esters; and as a minor ingredient, a defoamer.

7. The drilling fluid of claim 6 wherein the sulfated wax ester salt is the sodium salt, said defoamer comprising a mixture of complex compounds obtained as the residue from propane decolorization of fatty materials.

8. A drilling fluid for wells comprising water as the continuous phase, a mineral oil emulsified therein, an emulsifying agent dispersed in said fluid for maintaining the oil-in-water emulsion comprising an alkali salt of sulfated sperm oil and as a defoamer a mixture of the complex compounds obtained as the residue from the propane decolorization of fatty materials, the aqueous phase of said emulsion being alkaline and containing alkaline earth ions to inhibit swelling of hydratable formation clays.

9. A drilling fluid for wells comprising water as the continuous phase, a mineral oil emulsified therein, an emulsifying agent dispersed in said fluid for maintaining the oil-in-water emulsion comprising the sodium salt of sulfated sperm oil containing at least about 12% of fully saturated wax esters of long chain aliphatic monohydric alcohols and long chain aliphatic monobasic acids, 75–90 parts by weight; and a mixture of complex compounds obtained as the residue from propane decolorization of fatty materials, 10–25 parts by weight.

10. A drilling fluid for wells comprising water as the continuous phase, a mineral oil emulsified therein, an emulsifying agent dispersed in said fluid for maintaining the oil-in-water emulsion comprising a mixture of wax esters of monohydric alcohols ranging from 14 to 20 carbons and monobasic aliphatic acids ranging from 10 to 20 carbons; fully saturated wax esters comprising at least 18 and not more than about 43 percent of the total wax esters; the remainder of said wax esters comprising a member from the group consisting of alkali metal and alkaline earth salts of sulfated wax esters; and as a minor ingredient, a defoamer comprising a mixture of complex compounds obtained as the residue from propane decolorization of fatty materials.

11. A stable three-phase drilling fluid comprising water as the continuous phase having finely-divided solids suspended therein and a mineral oil emulsified therein, a small amount of a surfactant mixture comprising a mixture of wax esters of monohydric alcohols ranging from 14 to 20 carbons and monobasic aliphatic acids ranging from 10 to 20 carbons and mixed triglycerides of the aforementioned acids; the wax esters being the predominating portion of said mixture; fully saturated wax esters comprising at least 12 and not more than about 33 percent of said mixture; the remainder of said wax esters comprising a member from the group consisting of alkali metal and alkaline earth salts of sulfated wax esters; and as a minor ingredient, a defoamer comprising a mixture of complex compounds obtained as the residue from propane decolorization of fatty materials.

12. The drilling fluid of claim 11 wherein said mixture of wax esters and triglycerides comprises 75–90 parts by weight and said defoamer comprises 10–25 parts by weight.

13. A drilling fluid comprising water as the continuous phase having finely-divided solids suspended therein and a mineral oil emulsified therein, and an additive dispersed therein for maintaining the oil-in-water emulsion comprising 75–90% of an alkali salt of sulfated sperm oil and 10–25% of a mixture of complex compounds obtained as the residue from the propane decolorization of fatty materials, the aqueous phase of said emulsion being alkaline and containing alkaline earth ions to inhibit swelling of hydratable formation clays.

14. A drilling mud comprising water as the continuous phase having finely-divided solids suspended therein and a mineral oil emulsified therein, and an additive dispersed therein for maintaining the oil-in-water emulsion comprising 75–90% of an alkali salt of sulfated sperm oil containing at least about 12% of fully saturated wax esters of long chain aliphatic monohydric alcohols and long chain aliphatic monobasic acids and 10–25% of a mixture of complex compounds obtained as the residue from the propane decolorization of fatty materials, the aqueous phase of said emulsion containing alkaline earth ions to inhibit swelling of hydratable formation clays.

15. In the drilling of a terrestrial bore with the aid of a drilling fluid, the method which comprises forcing a drilling fluid to the bottom of the bore as it is being drilled and returning said mud to the surface of the well, said fluid being an oil-in-water emulsion and containing finely-divided solids suspended therein, and an emulsifier comprising a mixture of wax esters of monohydric alcohols ranging from 14 to 20 carbons and monobasic aliphatic acids ranging from 10 to 20 carbons; fully saturated wax esters comprising at least 18 and not more than about 43 percent of the total wax esters; the remainder of said wax esters comprising a member from the group consisting of alkali metal and alkaline earth salts of sulfated wax esters; and as a minor ingredient, defoamer.

16. In the drilling of a terrestrial bore with the aid of a drilling fluid, the method which comprises forcing a drilling fluid to the bottom of the bore as it is being drilled and returning said mud to the surface of the well, said fluid being an oil-in-water emulsion and containing finely-divided solids suspended therein, and an emulsifier comprising a mixture of wax esters of monohydric alcohols ranging from 14 to 20 carbons and monobasic aliphatic acids ranging from 10 to 20 carbons and mixed triglycerides of the aforementioned acids; the wax esters being the predominating portion of said mixture; fully saturated wax esters comprising at least 12 and not more than about 33 percent of said mixture; the remainder of said wax esters comprising a member from the group consisting of alkali metal and alkaline earth salts of sulfated wax esters; and as a minor ingredient, a defoamer comprising a mixture of complex compounds obtained as the residue from propane decolorization of fatty materials.

17. In the drilling of a terrestrial bore with the aid of a drilling fluid, the method which comprises forcing a drilling fluid to the bottom of the bore as it is being drilled and returning said mud to the surface of the well, said fluid being an oil-in-water emulsion and containing finely-divided solids suspended therein, and an emulsifier comprising a mixture of wax esters of monohydric alcohols ranging from 14 to 20 carbons and monobasic aliphatic acids ranging from 10 to 20 carbons; fully saturated wax esters comprising at least 18 and not more than about 43 percent of the total wax esters; the remainder of said wax esters comprising a member from the group consisting of alkali metal and alkaline earth salts of sulfated wax esters; and as a minor ingredient, a defoamer comprising a mixture of complex compounds obtained as the residue from propane decolorization of fatty materials.

18. An inhibitive drilling fluid for protection of terrestrial formations comprising an oil-in-water emulsion having solids suspended therein and stabilized by a sulfated sperm oil metal salt from the group consisting of alkali and alkaline earth metals, the aqueous phase of said emulsion containing one or more ionic constituents from the group consisting of sodium chloride, bivalent metal salts and hydroxide ions.

19. An inhibitive drilling fluid adapted for drilling oil bearing sands to minimize hydration of intergranular clays comprising oil-in-water emulsion stabilized by a surface active composition, said surface active composition comprising a sulfated sperm oil metal salt from the group consisting of alkali and alkaline earth metals, the aqueous phase of said emulsion containing sodium chloride, bivalent metal ions and hydroxide ions.

20. A method of rotary drilling oil and gas wells wherein the drilling encounters shale formations comprising circulating a drilling fluid to the drill bit and thence to the surface of the well, said drilling fluid comprising an oil-in-water emulsion having solids suspended therein and stabilized by a surface active material for reducing fluid loss to the shale formation comprising as the emulsifier a mixture of wax esters of monohydric alcohols ranging from 14 to 20 carbons and monobasic aliphatic acids ranging from 10 to 20 carbons and mixed triglycerides of the aforementioned acids; the wax esters being the predominating portion of said mixture; fully saturated wax esters comprising at least 12 and not more than about 33 percent of said mixture; the remainder of said wax esters comprising a member from the group consisting of alkali metal and alkaline earth salts of sulfated wax esters; and as a minor ingredient, a defoamer, the aqueous phase of said emulsion containing bivalent metal ions of the alkaline earth series.

21. The method of claim 20 wherein said metal ions are calcium ions.

22. A method of rotary drilling of oil and gas wells wherein the drilling encounters shale formations comprising circulating a drilling fluid to the drill bit and thence to the surface of the well, said drilling fluid comprising an oil-in-water emulsion, and a surface active emulsifier comprising a metal salt of sulfated sperm oil from the group consisting of alkali metals and alkaline earth metals for reducing fluid loss to the shale formation, the aqueous phase of said emulsion containing bivalent metal ions of the alkaline earth series in an amount sufficient to provide a total hardness in the aqueous phase ranging between 250–450 p. p. m. expressed as calcium carbonate, and finely divided solids dispersed in said emulsion.

23. The method of drilling oil and gas bearing formations comprising circulating a drilling fluid to the drill bit and thence to the surface of the well, said drilling fluid comprising an oil-in-water emulsion and a surface active emulsifier comprising a mixture of wax esters of monohydric alcohols ranging from 14 to 20 carbons and monobasic aliphatic acids ranging from 10 to 20 carbons and mixed triglycerides of the aforementioned acids; wax esters the predominating portion of said mixture; fully saturated wax esters comprising at least 12 and not more than about 33 percent of said mixture; the remainder of said wax esters comprising a member from the group consisting of alkali metal and alkaline earth salts of sulfated wax esters; and as a minor ingredient, a defoamer comprising a mixture of complex compounds obtained as the residue from propane decolorization of fatty materials, drilling fluid containing sodium chloride, ionized salts of alkaline earth metals and hydroxide ions.

24. A drilling fluid for gas and oil wells comprising water as the continuous phase, a mineral oil emulsified therein and emulsifying agent dispersed in said fluid for maintaining the oil-in-water emulsion comprising a member from the group consisting of alkali metal and alkaline earth salts of sulfated esters of long chain aliphatic alcohols and long chain aliphatic acids, the aqueous phase of said emulsion being alkaline and containing bivalent metal ions to inhibit swelling of hydratable formation clays.

25. A drilling fluid for oil and gas wells comprising water as the continuous phase, a mineral oil emulsified therein, an emulsifying agent dispersed in said fluid for maintaining the oil and water emulsion comprising as an essential ingredient thereof, an alkali metal salt of sulfated esters of monohydric aliphatic alcohols having between 14 and 20 carbons, and aliphatic acids having between 10 and 20 carbons, the aqueous phase of said emulsion being alkaline and containing alkaline earth metal ions to inhibit the swelling of hydratable formation clays.

26. A drilling fluid for oil and gas wells comprising water as the continuous phase, a mineral oil emulsified therein, an emulsifying agent dispersed in said fluid for maintaining the oil and water emulsion comprising as an essential ingredient thereof an alkaline earth salt of sulfated esters of long chain aliphatic alcohols and long chain aliphatic acids, the aqueous phase of said emulsion being alkaline and containing alkaline earth metal ions to inhibit the swelling of hydratable formation clays.

27. A drilling fluid for oil and gas wells comprising water as the continuous phase, a mineral oil emulsified therein and emulsifying agent dispersed in said fluid for maintaining the oil and water emulsion comprising a member from the group consisting of an alkali metal salt of sulfated sperm oil and an alkaline earth salt of sulfated sperm oil in combination with a defoamer comprising a mixture of the complex compounds obtained as the residue from the propane decolorization of fatty materials, the aqueuos phase of said emulsion containing alkaline earth ions to inhibit swelling of hydratable formation clays.

28. The composition of claim 27 wherein the emulsifying agent is an alkali metal salt of sulfated sperm oil.

29. The composition of claim 27 wherein said complex mixture is added in amounts in excess of that necessary to suppress foam in the drilling fluid.

30. A drilling fluid for oil and gas wells comprising an aqueous phase, a mineral oil phase, and a solid phase, said mineral oil phase emulsified in said aqueous phase by the sodium salt of sulfated sperm oil, said solid phase consisting of small inert particles having a uniformly distributed mobile water film on the particle surface, and the aqueous phase being alkaline and containing alkaline earth ions to inhibit the swelling of hydratable formation clays.

31. A composition adapted for emulsification of oil-in-water drilling fluids comprising a mixture of wax esters of monohydric alcohols ranging from 14 to 20 carbons and monobasic aliphatic acids ranging from 10 to 20 carbons; fully saturated wax esters comprising at least 18 and not more than about 43 percent of the total wax esters; the remainder of said wax esters comprising a member from the group consisting of alkali metal and alkaline earth salts of sulfated wax esters; and as a minor ingredient, a defoamer comprising a mixture of complex compounds contained as the residue from propane decolorization of fatty materials.

32. The composition of claim 31 wherein the mixture of complex compounds is added in an amount substantially in excess of that necessary to suppress foam formation in an emulsified drilling system.

33. A composition adapted for emulsification of oil-in-water drilling fluids comprising a mixture of wax esters of monohydric alcohols ranging from 14 to 20 carbons and monobasic aliphatitc acids ranging from 10 to 20 carbons and mixed triglycerides of the aforementioned acids; the wax esters being the predominating portion of said mixture; fully saturated wax esters comprising at least 12 and not more than about 33 percent of said mixture; the remainder of said wax esters comprising a member from the group consisting of alkali metal and alkaline earth salts of sulfated wax esters; and as a minor ingredient, a defoamer comprising a mixture of complex compounds obtained as the residue from propane decolorization of fatty materials.

34. The composition of claim 33 wherein said mixture of wax esters and triglycerides comprises 75–90 parts by weight and said defoamer comprises 10–25 parts by weight.

35. The composition of claim 33 wherein the mixture of complex compounds is added in an amount substantially in excess of that necessary to suppress foam formation in an emulsified drilling system.

36. A composition adapted for emulsification of oil-in-water drilling fluids which comprises an alkali metal salt of sulfated sperm oil containing at least about 12% of fully saturated wax esters of long chain aliphatic monohydric alcohols and long chain aliphatic monobasic acids, 75–90 parts by weight; and a mixture of complex compounds obtained as the residue from the propane decolorization of fatty materials, 10–25 parts by weight.

References Cited in the file of this patent

UNITED STATES PATENTS

| | | |
|---|---|---|
| 1,875,001 | Hoel | Aug. 30, 1932 |
| 2,067,888 | Chamberlin | Jan. 19, 1937 |
| 2,209,591 | Barnes | July 30, 1940 |
| 2,555,794 | Henkes | June 5, 1951 |
| 2,582,323 | Fischer | Jan. 15, 1952 |
| 2,668,138 | Walker et al. | Feb. 2, 1954 |
| 2,679,478 | Fischer et al. | May 25, 1954 |

FOREIGN PATENTS

| | | |
|---|---|---|
| 456,785 | Canada | May 17, 1949 |

UNITED STATES PATENT OFFICE
CERTIFICATE OF CORRECTION

Patent No. 2,799,646                                          July 16, 1957

Felix E. Lacey et al.

It is hereby certified that error appears in the printed specification of the above numbered patent requiring correction and that the said Letters Patent should read as corrected below.

Column 8, line 29, for "ten" read -- tend --; column 9, line 31, for "suds" read -- muds --; line 43, for "it solubility" read -- its solubility --; column 13, line 49, before "defoamer" insert -- a --; column 15, line 3, before "drilling" insert -- the aqueous phase of said --; column 16, line 11, for "contained" read -- obtained --.

Signed and sealed this 27th day of August 1957.

(SEAL)
Attest:

KARL H. AXLINE                                                  ROBERT C. WATSON
Attesting Officer                                         Commissioner of Patents